United States Patent [19]

Hines et al.

[11] Patent Number: 5,048,338
[45] Date of Patent: * Sep. 17, 1991

[54] ELECTRONIC BOBWEIGHT ELIMINATOR

[75] Inventors: Gordon E. Hines; Ronald W. Anderson, both of Ann Arbor; Leonard J. Salenbien, Saline, all of Mich.

[73] Assignee: Hines Industries, Inc., Ann Arbor, Mich.

[*] Notice: The portion of the term of this patent subsequent to Jul. 3, 2007 has been disclaimed.

[21] Appl. No.: 544,834

[22] Filed: Jun. 27, 1990

Related U.S. Application Data

[63] Continuation-in-part of Ser. No. 340,144, Apr. 17, 1989, Pat. No. 4,938,064.

[51] Int. Cl.$^5$ .............................................. G01M 1/16
[52] U.S. Cl. ......................................... 73/462; 29/901
[58] Field of Search ................. 73/460, 461, 462, 463, 73/464, 465, 466, 467, 468, 469, 470; 29/901

[56] References Cited

U.S. PATENT DOCUMENTS 3,777,340 12/1973 Langlois .............................. 29/1 D
3,871,234 3/1975 Langlois .............................. 73/460
4,480,472 11/1984 Wood ................................... 73/462

Primary Examiner—Jerry W. Myracle
Attorney, Agent, or Firm—Emch, Schaffer, Schaub & Porcello Co.

[57] ABSTRACT

The present invention provides for a method of generating an electronic bobweight signal used to offset an unbalance signal before the unbalance signal is received at the input portion of the electronic circuitry of the unbalance detection system. The electronic bobweight signal and unbalance signal are matched in their phase angle and are each sampled a specified number of equally spaced times per revolution of the workpiece to provide accurate bobweighted unbalance data without the need for use of physical bobweights and their inherent disadvantages.

5 Claims, 2 Drawing Sheets

ELECTRONIC BOBWEIGHT ELIMINATOR

BACKGROUND OF THE INVENTION

This application is a continuation-in-part of our co-pending application Ser. No. 07/340,144, filed on Apr. 17, 1989, and now U.S. Pat. No. 4,938,064.

Many workpieces are designed to operate in a dynamically balanced rotational condition carrying attached bodies or tools having a specific mass. Therefore, when the workpiece is disattached from the bodies or tools it will have a certain inherent rotational unbalance. The present invention provides an improved method of offsetting this inherent rotational unbalance of a workpiece in order to accurately complete a dynamic balancing study of the same workpiece. Such balancing studies are in order, for instance, when the workpiece is first manufactured or when it is being altered for some after-market design. These offsetting methods during dynamic balancing studies are traditionally called "bobweighting" and have specifically been applied to the balancing of workpieces such as flywheels and crankshafts which have a plurality of offset throws. For the purposes of illustration and simplicity the method of the present invention will be described as applied to crankshaft balancing. The method, however, is applicable to all balancing operations which require some form of bobweighting and the present description is not intended to be limited solely to use with crankshafts.

A crankshaft is designed to operate in a rotationally balanced condition while carrying a plurality of pistons, each having a specific mass. Any attempt to dynamically balance the individual crankshaft must account for the unbalance created by the missing mass of each piston which would normally be fixed to the various throws. A traditional method of providing the necessary duplication of mass is to counterweight or bobweight the workpiece or crankshaft. The bobweights must be accurately constructed and individually attached to each throw of the crankshaft to ensure the accurate duplication of running conditions. While this methodology is proven to be acceptable and accurate in duplicating crankshaft running conditions, the use of such bobweights creates an undesirable complexity in the balancing operation due to the manpower and time consumption needed to properly attach and remove each physical bobweight.

Recent attempts to improve upon the traditional method of bobweighting have focused on electronically offsetting the measured balance reading received from the rotating workpiece. These attempts to electronically offset the bobweight unbalance usually rely either upon a measurement of unbalance from a master part previously balanced with bobweights or master data relating to proper bobweighting provided by the manufacturer. The value of the bobweight unbalance measurement is then used to reduce subsequent unbalance readings taken on subsequent similar parts. Problems have been encountered, however, with such an electronic unbalance offset due to inefficiencies in the electrical circuitry of the components used to analyze the electronic signals and modify the electronic readings of unbalance. Due to the inherent non-zero temperature coefficients of resistance and capacitance of physical components, there is a drift error in the amount and phase angle of the unbalance vector signals from cold startup of the electronic components until the temperature of the components has stablized. This drift error can amount to a 2 to 3% change in the amount and phase of the unbalance vector. A 2 to 3% drift error is completely undesirable for a situation where it is necessary to balance a workpiece to fine tolerances. For instance, if it is desired to balance a workpiece to 15 ounce inches of unbalance with a tolerance of plus or minus 0.25, the 2 to 3% drift in the electronics is the equivalent to the tolerance for the balance.

Therefore, a need remains for an improved bobweight system which eliminates the need for use of physical bobweights and yet overcomes the problems encountered by the current electronic bobweight unbalance elimination systems.

SUMMARY OF THE INVENTION

The present invention provides a method for generating an electronic bobweight signal to offset an unbalance signal received at the input portion of the electronic components of an unbalance measuring device before the unbalance signal reaches the portion of the electronic circuitry that causes signal drift due to temperature changes. The present invention uses a precision voltage reference and a digital analog converter to synthesize the electronic bobweight signal to be mixed with the unbalance signal received from the vibration pickups. The resulting unbalance reading is then indicative of the actual unbalance of the workpiece with the bobweight unbalance having been compensated for prior to signal exposure to any potential temperature drift.

DESCRIPTION OF THE PREFERRED EMBODIMENT

Figure 1:
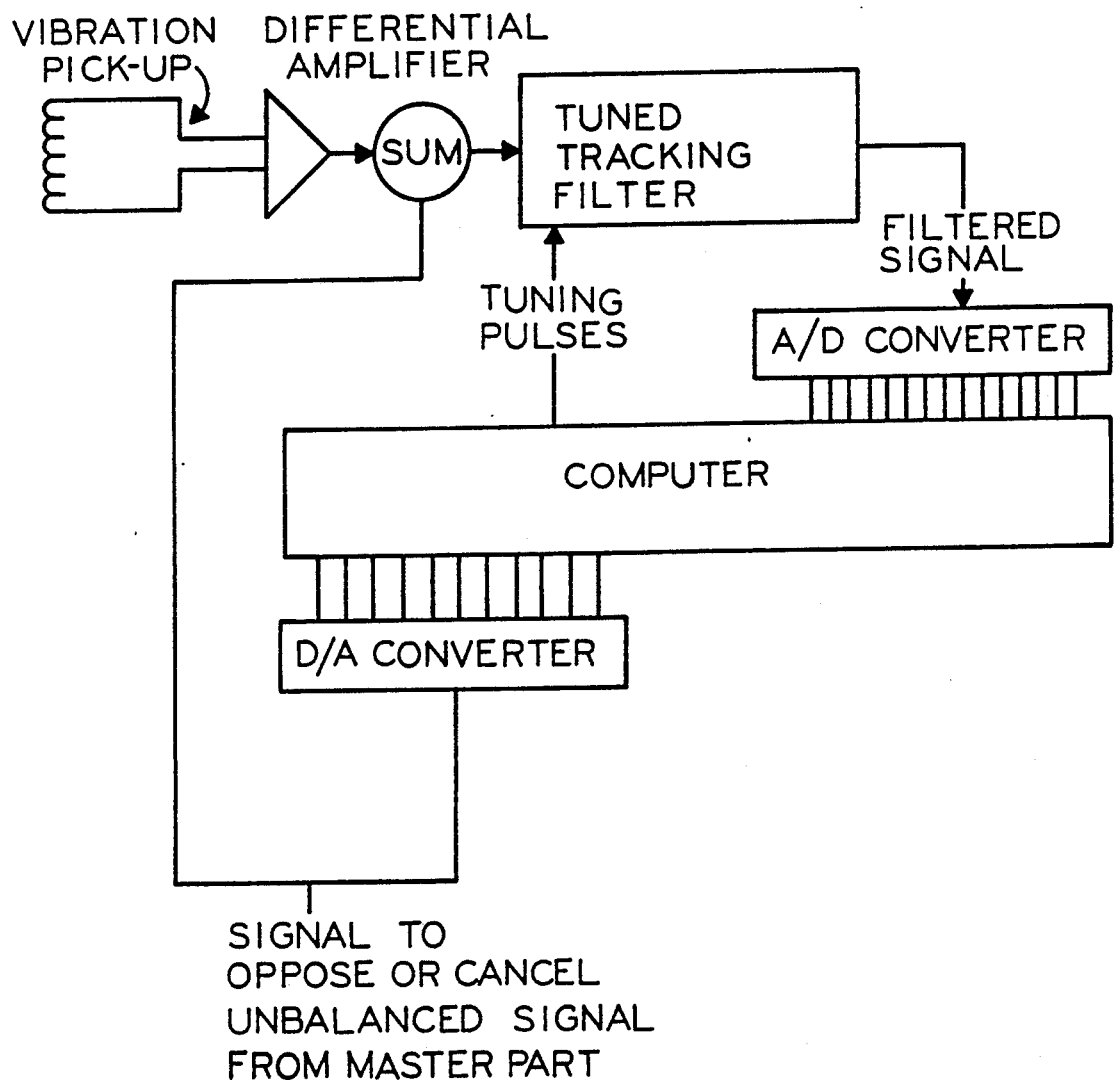
FIG. 1 is a block diagram showing the circuit for the electronic bobweight counterbalance system of the present invention.

The present invention provides for an electronic bobweight counterbalance system which generates a predetermined bobweight signal which is used to cancel or offset the unbalance signal received, during the dynamical balancing of a workpiece, at the input of the analog amplifier.

The bobweight signal is generated by one of two methods. The signal can be obtained by measuring the unbalance of a master part which had been previously balanced using bobweights. The unbalance of the master part when rotated without bobweights accurately portrays the bobweight unbalance of the workpiece. Alternatively, the bobweight unbalance may be obtained from master data for a specific workpiece as supplied by the manufacturer. This bobweight unbalance data is programmed into the computer for a given style or shape of workpiece. Once the computer is calibrated by data obtained from either the master part or the manufacturer, the bobweight unbalance signal is used to oppose the total workpiece unbalance signal which is received from vibration pickups when measuring subsequent similar workpieces.

The bobweight signal is retained in the computer from the data generated by the master part or master data received from the manufacturer. The bobweight signal, when viewed electronically is in the general form of a sine curve because any unbalance signal of a rotating workpiece, if seen without disturbing noise, would appear as a sinewave as the result of the vibration pickup viewing the projection of any unbalance vector in one plane, the plane of the sensitivity of the pickup. Therefore, the unbalance signal is shown to be a sine function of the angular position of the unbalance vector.

When balancing a workpiece, each measurement of unbalance received from the vibration pickups must correlate with and be offset by a bobweight signal. The position of the bobweight signal on the sine curve must, therefore, be timed to the exact position of the rotating workpiece during each measurement of unbalance. An unbalance measurement of a rotating workpiece is typically taken 32 times per revolution of the workpiece on equally spaced intervals and the unbalance signal must be accurately timed to correlate with these samples. While 32 samples have been typically used per revolution, any number of samples will suffice depending on the tolerances for accuracy. An even binary number is preferable due to the convenience in calculations since division by an even binary number can be easily accomplished.

The timing of the incoming unbalance signal with the bobweight signal generated by the computer is critical. The two signals must start at the same vector phase angle and the sampling distribution of the rotating workpiece must accurately mate with the sampling distribution of the sine curve for the bobweight signal retained in the memory of the computer. Knowledge of the precise phase angle of an incoming unbalance signal from the rotating workpiece is essential to achieving an accurate correlation with the bobweight unbalance data retained in the computer. An error of 0.6° in the applied bobweight signal will introduce a 1% error in the bobweight vector. Therefore, it is essential to sense the position of the crankshaft or workpiece within fractions of a degree as it is rotating. Our copending application details the geometry used to find the center of the crank pin which was used as the phase angle reference marker. To achieve the proper alignment of the unbalance measurement signal with the bobweight unbalance data, the photo emitter and detector had to be precisely aligned 180° apart with respect to the centerline of the crank, and the phase angle was calculated using inputted knowledge of the crankshaft dimensions relating to the radius of the pin and the "throw" distance of the crankshaft. The present improvement greatly simplifies the ability to locate the center of the crankshaft and, therefore, correctly align the phase angles of the unbalance measurements with the unbalance signals.

The object is to provide a light emitter, such as a laser, and a photodetector on opposed sides of the rotating workpiece. The light emitter and photodetector must be oriented in a generally level or horizontal position with regard to the axis of rotation of the workpiece. The height of the emitter/detector combination with respect to the axis of rotation of the workpiece will alter the width of the detection pulse. For instance, if the emitter/detector combination is raised toward the axis of rotation, the light or laser beam will be interrupted by the rotation of the crank for a long period of time when compared to placement of the emitter/detector combination in a lower position relative to the rotation of the workpiece. Regardless of what the width of the interruption pulse is, one-half of the pulse or the center of the pulse will always represent when the workpiece is oriented precisely 9° below the horizontal axis of rotation. Knowing this electronic coordinate of the workpiece position, the incoming unbalance signal from the computer can be accurately correlated in phase and angle.

The light emitter and the photodetector are positioned with respect to the axis of rotation so that the pin of the crank breaks the light beam once per revolution to provide a reference pulse having a measurable width. Assuming that the workpiece is turning at a constant speed, the width of the reference pulse is measured by the counting of timing pulses received from an encoder or a fixed timebase clock. Since the workpiece is rotating at a constant speed the reference pulse will be of the same width per revolution. Therefore, on the next revolution, assuming constant speed and a reference pulse of the same width, half as many pulses are counted from the encoder and a second reference pulse is outputted to the balancer electronics to mark the halfway point of revolution. This halfway point or half-pulse represents the position of the workpiece 90° below horizontal. An alternative method is to divide the fixed timebase clock reading by two to provide a second reference pulse at the halfway point of revolution.

A preferred method of achieving the measurement of the reference pulse and generating a second reference pulse functions as follows. As the first reference photo-pulse is measured, the count from the encoder or clock is latched into a first set of latches and the count is reset to zero. When the next photo-pulse occurs, the count from the counter is compared with the latched valve from the previous revolution, however the latched value must be shifted one bit toward the lower order count. In a binary value counting system, a one-bit shift results in a one-half count or the center of the pulse. When the counter on the next revolution counts one-half as many pulses as were latched from the previous revolution, a comparitor circuit sets a flip-flop and the end of the photo-pulse resets the flip-flop. The end of the photo-pulse count triggers the latch input to store the just-accumulated pulse count and resets the counter for the next revolution.

Figure 2:
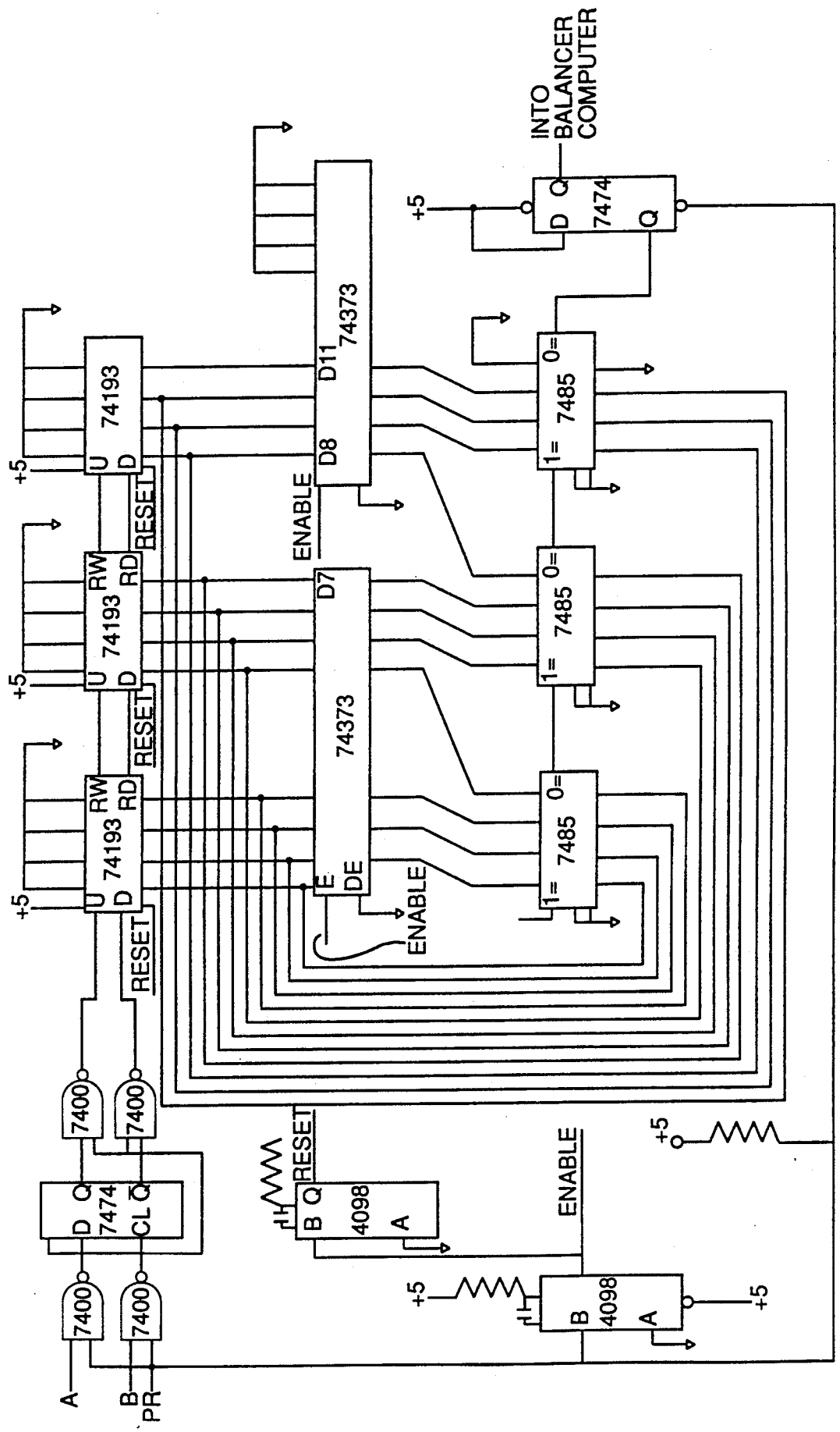
FIG. 2 is an electrical circuit diagram showing the preferred embodiment for locating and coordinating the vector phase angle of the workpiece unbalance measurement with the electronic bobweight signal for the present invention.

Referring now to FIG. 2, the 74193 circuits are the counters which are driven by up-down logic from the two phase encoder output. The 74373 circuits are the latches and the 7485 circuits are the comparators. The connections to the comparators are shifted by one binary place, thus producing a hardwired divice by two for the count latched at the end of the previous reference pulse. The inputs to the FIG. 2 circuit are shown in the upper left hand corner of the drawing and given the references "A", "B" and "PPR". The inputs receive signals from the encoder or clock which is receiving signals from the emitter/detector combination. The encoder outputs "A" and "B" are represented respectively by two square waves that are 90° out of phase. It is possible to determine which direction the workpiece is rotating by viewing the transition of the phase "B" square wave when the phase "A" square wave is high. If the "A" wave is high when "B" goes high, one direction of rotation is indicated. If "A" is low when "B" goes high, the opposed direction of rotation is indicated. Therefore, the input of "A" with the photo pulse input "PPR" results in an output "Q" from the flip-flop 7474. The input of "B" with photopulse input "PPR" results in the complementary "$\bar{Q}$" output which is the inverse of "Q", showing opposed rotation. These outputs "Q" and "$\bar{Q}$" are used to gate the phase pulses to the Up or Down input of the bidirectional counters 74193. Generally, since the workpiece is usually turning in one direction, the counters will count up. However, should a reversal occur on starting or stopping, the counter will always remain synchronized with the position of the workpiece.

The output Q of the flip-flop 7474 located at the lower right hand corner is equal to one-half of the input "PPR". This output Q therefore precisely locates the position of the workpiece and enables the workpiece phase and angle to be precisely coordinated with the computers bobweight unbalance signal.

Referring now to FIG. 1, the computer will select the equally spaced values from the sine table of bobweight data and output it through the digital to analog converter to mix with the incoming unbalance signal being received from the vibration pickup. The starting point of the sine table is referenced to the synchronizing mark on the workpiece.

The sine table containing the bobweight unbalance data contains values that exercise the full scale of the digital to analog converter. The values from the sine table are multiplied by the predetermined calibration factor scaled to a number between 0 and 1 to determine the digital value actually applied to the digital to analog converter. A binary search method may then be used to vary either the gain factor or the starting point in the sine table in such a manner as to minimize the unbalance signal. Essentially the system will do a binary search for the proper gain and phase (starting point in the sine table) to minimize the differences between the bobweight signal and the incoming unbalance signal. Alternatively, the unbalance of the workpiece may be obtained with the bobweight signal turned off. Then, turning the bobweight signal on with a known calibration factor of, for example, 0.5 and a known phase offset of 0.0, the unbalance can be measured again. The first reading is then subtracted vectorally from the second reading to provide the effect of a calibration factor of 0.5 and a 0.0 phase offset. The required calibration and phase angle are then calculated to cancel the unbalance signal measured on the first spin. This alternative method provides a good first guess at the unbalance values and a limited binary search can then be used to trim the unbalance values to the very best limits.

The sine table values are scaled so that the maximum value is the maximum input to the digital to analog converter. That is, for a ten bit maximum input to the digital to analog converter, the bobweight signal can range over the values $-512$ to $+511$ without over ranging the input of the digital to analog converter. The sine table is then scaled with 256 values so that the values are calculated by the formula, (value) $n = 512 \times \sin(n/256 \times 2 \times PI)$. The sine function computes the sine of the angle in radians. The table of 256 values for $n=0$ to $n=255$ yields the scaled values for 255 equally spaced angles starting at zero. The values are then divided by the number of times the workpiece is sampled per revolution. For instance if a 32 times per revolution sample, every eighth value in the table would be sampled with the table index set to the calculated starting offset each time the part synchronizing mark occurs.

The present invention will provide the bobweight circuit for two plane balancing as well as one plane balancing. In two plane balancing, each vibration pickup includes a bobweight circuit as described above and the controller will search for the best values on both channels simultaneously.

The above description of the preferred embodiment is intended to be illustrative of the invention and is not intended to be limiting upon the scope and content of the following claims.

We claim:

1. A method for rotationally balancing a workpiece, the end use of which is to carry attached bodies of specified mass in a balanced rotational operation, comprising the steps of:

positioning such workpiece without such attached bodies for rotation;

rotating such workpiece to induce a rotational vibration of such workpiece;

monitoring said rotational vibration of such workpiece and generating an electronic signal representative of said vibration;

processing such electronic signal to determine the amount and location of such rotational unbalance;

generating a second electronic signal representative of any unbalance solely created by the removal of such attached bodies from such workpiece; and, applying said second electronic signal to said first electronic signal to offset said first electronic signal by the amount of unbalance solely created by such removed bodies, whereby the amount of unbalance signal remaining is solely representative of the inherent rotational unbalance of the workpiece as if such workpiece were operating with such bodies attached, said second electronic signal being applied to said first electronic signal prior to said first electronic signal being processed to determine the amount and location of such rotational unbalance.

2. The method of claim 1, wherein said second electronic signal is generated by measuring the unbalance of a master workpiece without attached bodies, said master workpiece being of the same configuration as such workpiece, wherein said master workpiece had been previously balanced to operate in a rotationally balanced manner with said attached bodies.

3. The method of claim 1, wherein said second electronic signal is generated from master data supplied by the manufacturer of such workpiece.

4. The method of claim 1, wherein said first and second signals are timed to correlate at identical phase angles for any selected point in the rotation of such workpiece.

5. The method of claim 1, wherein such electronic signal is sampled at equally spaced intervals per one revolution of such workpiece and said second electonic signal is sampled at the same number of equally spaced identical intervals per revolution of such workpiece.

* * * * *

UNITED STATES PATENT AND TRADEMARK OFFICE
CERTIFICATE OF CORRECTION

PATENT NO. : 5,048,338
DATED : September 17, 1991
INVENTOR(S) : Gordon E. Hines, et al.

It is certified that error appears in the above-identified patent and that said Letters Patent is hereby corrected as shown below:

Column 4, after line 66, insert the followings:

-- "PPR" results in an output "Q" from the flip-flop 7474. The input of "B" with the photopulse input "PPR" results --.

Signed and Sealed this

Fourth Day of May, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,048,338
DATED : September 17, 1991
INVENTOR(S) : Gordon E. Hines, et. al.

It is certified that error appears in the above-indentified patent and that said Letters Patent is hereby corrected as shown below:

Column 4, line 4, "9°" should be --90°--

Column 4, line 51, "divice" should be --divide--

Signed and Sealed this

Fifteenth Day of March, 1994

Attest:

BRUCE LEHMAN

*Attesting Officer*  *Commissioner of Patents and Trademarks*